(12) United States Patent
Yamauchi

(10) Patent No.: US 6,666,290 B2
(45) Date of Patent: Dec. 23, 2003

(54) POWER UNIT FOR A MOTORCYCLE

(75) Inventor: Kosaku Yamauchi, Hamana-Gun (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 42 days.

(21) Appl. No.: 09/968,984

(22) Filed: Oct. 3, 2001

(65) Prior Publication Data

US 2002/0038734 A1 Apr. 4, 2002

(30) Foreign Application Priority Data

Oct. 3, 2000 (JP) .................................... 2000-304004

(51) Int. Cl.[7] ............................................. B60K 11/00
(52) U.S. Cl. ..................... 180/68.1; 180/219; 123/41.01
(58) Field of Search ............................. 180/68.1, 219, 180/230; 123/41.01, 41.41, 41.42, 41.44

(56) References Cited

U.S. PATENT DOCUMENTS

| 4,198,935 A | * | 4/1980 | Seibt et al. ............... 123/41.44 |
| 4,470,379 A | * | 9/1984 | Miyakoshi et al. ......... 123/59.6 |
| 4,476,951 A | * | 10/1984 | Ito .............................. 180/219 |
| 4,493,190 A | * | 1/1985 | Yamakawa ................... 60/714 |
| 4,598,785 A | * | 7/1986 | LeBlanc ....................... 180/68.1 |
| 4,712,629 A | * | 12/1987 | Takahashi et al. .......... 180/68.1 |
| 4,958,095 A | * | 9/1990 | Uchida et al. ................. 310/59 |
| 4,960,081 A | * | 10/1990 | Atsuumi .................... 123/41.31 |
| 5,074,254 A | * | 12/1991 | Takamatsu ................ 123/41.44 |
| 5,103,774 A | * | 4/1992 | Hirata et al. ................ 123/41.1 |
| 5,113,807 A | * | 5/1992 | Kobayashi ................ 123/41.74 |
| 5,343,832 A | * | 9/1994 | Murray ....................... 123/44 B |
| 5,687,690 A | * | 11/1997 | Kamiyama et al. ..... 123/198 R |
| 5,799,765 A | * | 9/1998 | Ono et al. ................. 192/58.62 |
| 6,021,747 A | * | 2/2000 | Gee et al. ................. 123/41.12 |
| 6,260,515 B1 | * | 7/2001 | Tosaka et al. ........... 123/41.08 |
| 6,267,087 B1 | * | 7/2001 | Takahashi et al. ........ 123/41.44 |
| 6,341,659 B1 | * | 1/2002 | Ibukuro ....................... 180/219 |
| 6,357,413 B1 | * | 3/2002 | Ito et al. ................... 123/197.1 |
| 6,481,408 B2 | * | 11/2002 | Tsutsumikoshi ........ 123/195 R |

* cited by examiner

Primary Examiner—Brian L. Johnson
Assistant Examiner—Kelly E Campbell
(74) Attorney, Agent, or Firm—Oblon, Spivak, McClelland, Maier & Neustadt, P.C.

(57) ABSTRACT

The power unit for a motorcycle comprising an engine unit having a casing in which a crankshaft and a countershaft are rotatably supported in parallel to each other, and a transmission unit having a casing in which a transmission input shaft and a transmission output shaft are rotatably supported in parallel to each other to define a dry belt drive-type transmission device. The transmission input shaft of the transmission unit is being connected to the countershaft of the engine unit so as to be rotatable together with the countershaft. A cooling fan chamber is provided at a joined portion of the casing of the engine unit to the casing of the transmission unit, said cooling fan chamber is communicated with an inside and outside of the casing of the transmission unit. A cooling fan is disposed in said cooling fan chamber so as to rotate together with the connecting portion of the countershaft and the transmission input shaft in a vicinity of said connection section. The cooling fan introduces cooling air into the casing of the transmission unit.

7 Claims, 5 Drawing Sheets

POWER UNIT FOR A MOTORCYCLE

BACKGROUND OF THE INVENTION

The present invention relates to a power unit for a motorcycle such as a scooter-type vehicle.

With respect to a motorcycle such as a scooter-type vehicle, there has been proposed a power unit, which is composed of an engine unit for generating power in combination with a transmission unit, which is separated from the engine unit and includes a belt drive-type transmission device such as a CVT (Continuously Variable Transmission) therein. According to such a power unit, it is possible not only to manufacture the respective units mentioned above in different manufacturing places, thus improving productivity and maintenance property of the power unit, but also to make a change in combination of the units, coping with many types of motorcycle.

In such a power unit, a crankshaft and a countershaft are rotatably supported in a casing of the engine unit and a transmission input shaft and a transmission output shaft are rotatably supported in parallel to each other in a casing of the transmission unit to define a belt drive-type transmission device so that the transmission input shaft of the transmission unit is connected to the countershaft of the engine unit so as to be rotatable together with the countershaft.

Heat is generated through internal friction of a belt due to its expansion and contraction as well as contact friction between the belt and pulleys during operation of the belt drive-type transmission device of the transmission unit.

Accordingly, the pulley placed on the input side or the output side in the belt drive-type transmission device is provided with a cooling fan so that the cooling fan is rotatable together with the pulley, with the result that outside air serving as cooling air is sucked into the casing through a suction duct provided thereon, thus introducing the cooling air into the casing to carry out a cooling process.

There however exist problems that intense heat generated by the engine unit is transmitted through the casing and the countershaft to the transmission unit, even when the cooling fan cools frictional heat generated by the belt drive-type transmission device per se, making it impossible to provide a sufficient cooling effect of the transmission unit, thus deteriorating durability of the belt as well as the belt drive-type transmission device.

SUMMARY OF THE INVENTION

The object of the present invention, which was made to solve the above-described problems, is to provide a power unit for a motorcycle, which comprises an engine unit and a transmission unit and permits to isolate heat generated by the engine unit from the transmission unit and enhance a cooling operation in the transmission unit, thus improving durability of a belt drive-type transmission device.

This object can be achieved according to the present invention by providing, in one aspect, a power unit for a motorcycle comprising:

an engine unit having a casing in which a crankshaft and a countershaft are rotatably supported in parallel to each other;

a transmission unit having a casing in which a transmission input shaft and a transmission output shaft are rotatably supported in parallel to each other to define a dry belt drive-type transmission device, said transmission input shaft of the transmission unit being connected to said countershaft of the engine unit so as to be rotatable together with said countershaft;

a cooling fan chamber provided at a joined portion of the casing of said engine unit to the casing of said transmission unit, said cooling fan chamber communicating with inside and outside of the casing of the transmission unit; and a cooling fan disposed in said cooling fan chamber so as to rotate together with a connecting portion of said countershaft with said transmission input shaft in a vicinity of said connection section;

Wherein said cooling fan introduces cooling air into the casing of the transmission unit.

Such a structure of the power unit for a motorcycle causes cooling air to flow always during operation of the power unit in the cooling fan chamber, which is provided between the casing of the engine unit and the casing of the transmission unit. Accordingly, it is possible to isolate heat generated by the engine unit from the transmission unit and enhance the cooling operation in the transmission unit, thus improving durability of the belt drive-type transmission device.

In preferred embodiment of the above aspect, an additional cooling fan is also provided on the transmission output shaft so as to rotate together with the transmission output shaft, an opening communicating with outside of said transmission unit is provided in a vicinity of said additional cooling fan, one of said additional cooling fan and said cooling fan provided rotatably together with said countershaft and said transmission input shaft serves as a inlet fan and an other thereof serves as a suction fan.

Such a structure makes it possible to increase flow velocity and flow rate of the cooling air in the casing of the transmission unit, thus remarkably improving the cooling operation in the transmission unit, in comparison with a case where a single fan is provided.

More preferred embodiment of the above aspect, said cooling fan provided rotatably together with said countershaft and said transmission input shaft can be made of material having a high thermal conductivity.

This structure makes it possible to radiate the most of heat, which is generated by the engine unit and is apt to be transmitted to the transmission unit through the countershaft, by means of the cooling fan, thus isolating heat from the transmission unit.

Further preferred embodiment of the above aspect, said joined portion of the casing of said engine unit to the casing of said transmission unit is provided with a gasket held therebetween, said gasket being made of thermal insulating material. The above-mentioned gasket isolates heat of the casing of the engine unit from the casing of the transmission unit.

More preferred embodiment of the above aspect, said countershaft and said transmission input shaft are connected to each other through a flexible joint. Such a flexible joint absorbs torque fluctuation caused from the countershaft so as to prevent sudden slip from occurring between the belt and the pulleys of the belt drive-type transmission device. An excessively large frictional force therefore does not occur, improving the cooling operation in the transmission unit.

Also, said cooling fan provided rotatably together with said countershaft and said transmission input shaft is stationarily secured to a side of said countershaft; and said flexible joint is provided between said cooling fan and said transmission input shaft.

Such a structure makes it possible to radiate the most of heat, which is generated by the engine unit and is apt to be transmitted to the transmission unit through the countershaft, by means of the cooling fan, and isolate residual heat from the transmission input shaft by means of the flexible joint, thus effectively preventing heat generated by the engine unit from being transmitted to the transmission unit.

Further preferred embodiment of the above aspect, at least one portion of said flexible joint is made of thermal insulating material. Such a structure makes it possible to surely isolate heat, which is generated by the engine unit and is apt to be transmitted to the transmission unit through the countershaft and the transmission input shaft, by means of the flexible joint, thus further enhancing the cooling operation in the transmission unit.

DESCRIPTION OF PREFERRED EMBODIMENTS

An embodiment of the present invention will be described below with reference to the accompanying drawings.

Figure 1:
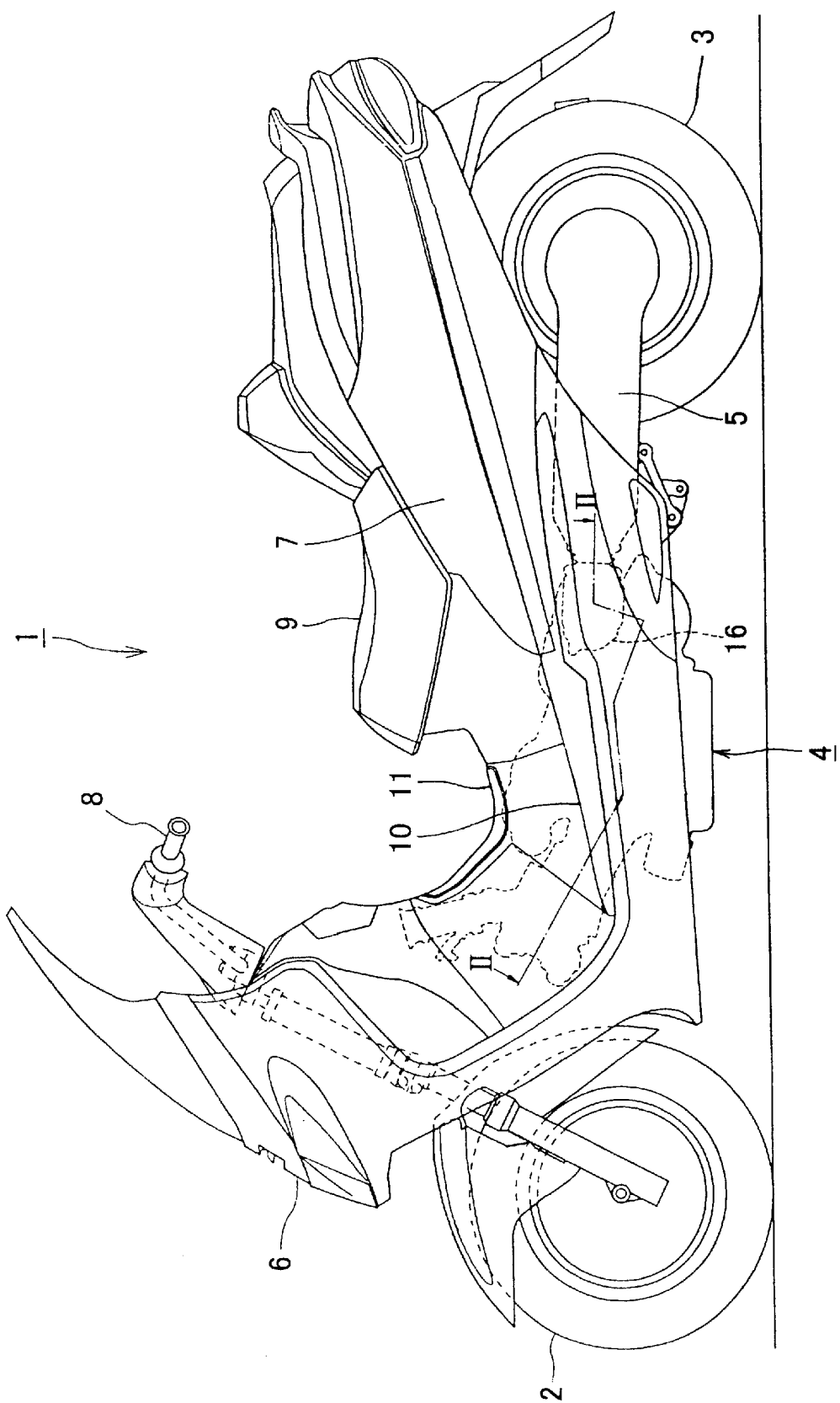
FIG. 1 is a left-hand side view illustrating an example of a scooter-type motorcycle on which a power unit of the present invention is mounted.

FIG. 1 is a left-hand side view illustrating an example of a scooter-type motorcycle on which a power unit of the present invention is mounted. The motorcycle 1 has the power unit 4 mounted between a front wheel 2 and a rear wheel 3 so that output of the power unit is transmitted to the rear wheel 3 by means of a shaft drive unit 5.

A body is entirely covered with a front cowling 6 and a frame cover 7, which are made of synthetic resin. A pair of step boards 10 is provided in a low position between a handle bar 8 for steering the front wheel 2 and a driver's seat 9 on which a rider is to be sat. A central console 11 is provided between the pair of step boards 10 so as to receive the front half portion of the power unit 4. A fuel tank and a storage chamber, which are not shown, are disposed below the driver's seat 9.

Figure 2:
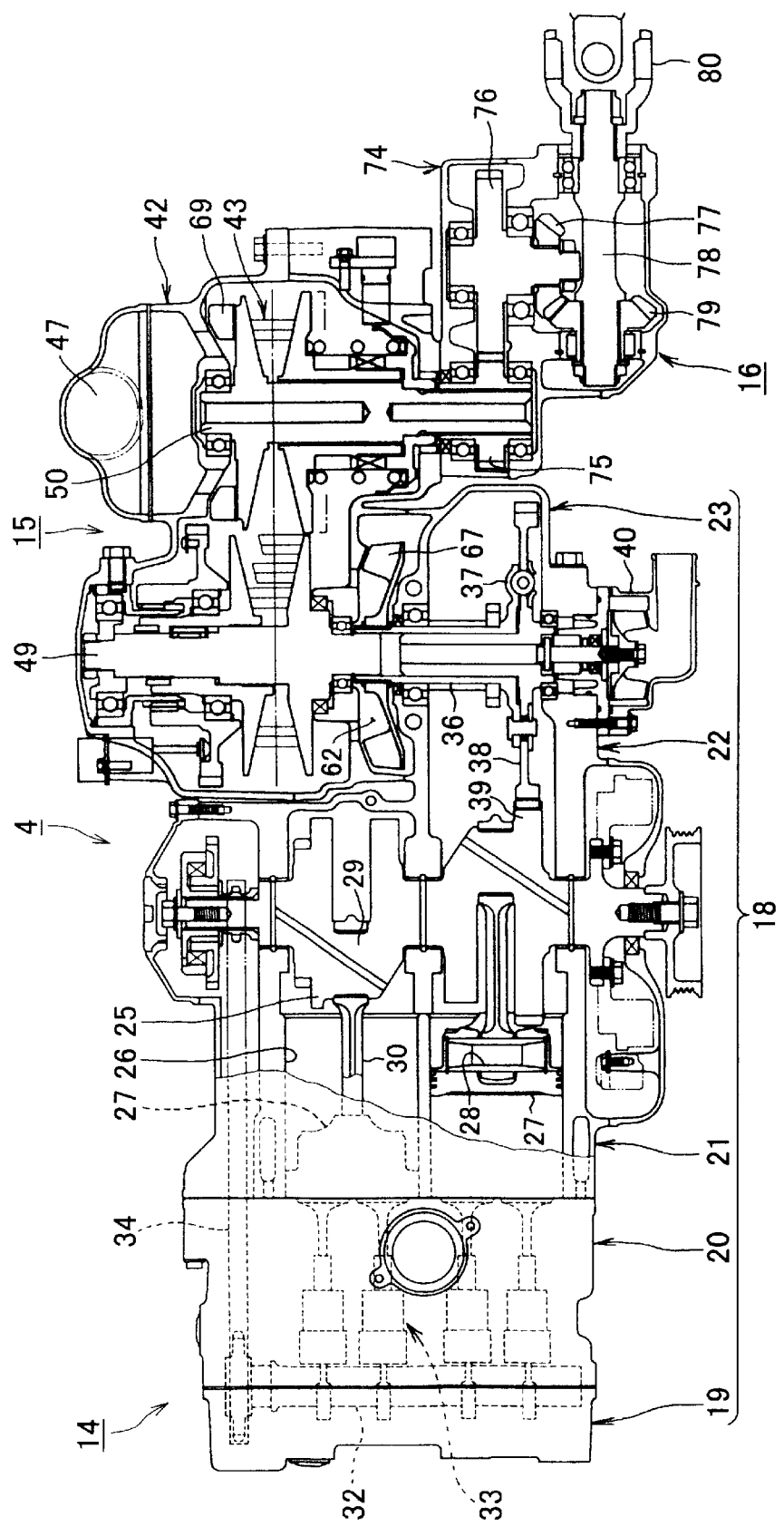
FIG. 2 is a cross-sectional view of the power unit cut along a line II—II in FIG. 1.
Figure 3:
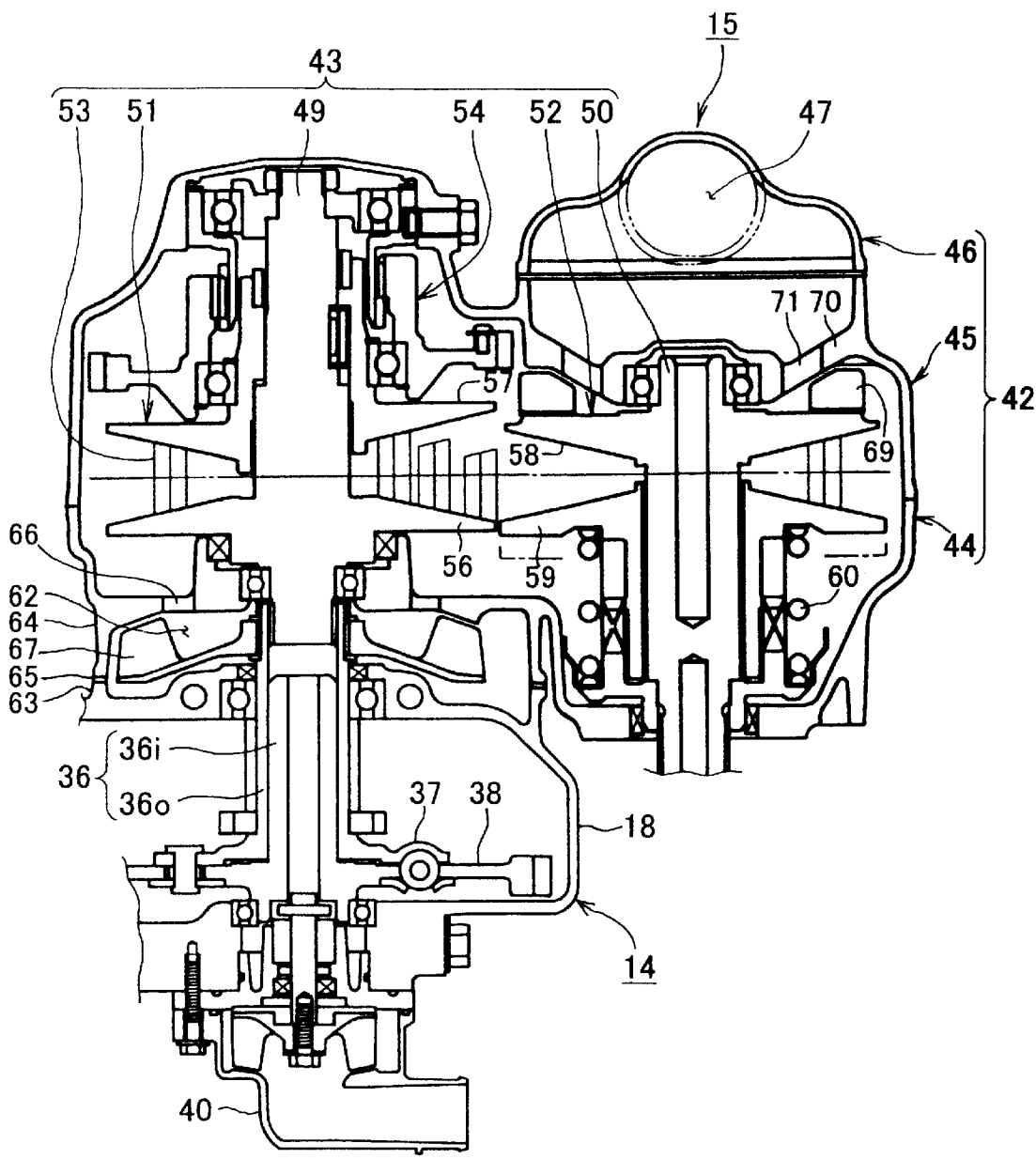
FIG. 3 is an enlarged cross-sectional view of the rear portion of the engine unit and the transmission unit of the first embodiment of the present invention.

FIG. 2 is a cross-sectional view of the power unit 4 cut along a line II—II in FIG. 1. The power unit 4 is a composite body in which the engine unit 14, a transmission unit 15 and a bevel unit 16.

A casing 18 of the engine unit 14 is composed of a head cover 19, a cylinder head 20, a cylinder block 21, a crankcase 22 and a rear cover 23 in this order from the front side to the rear side of the body. A crankshaft 25 is rotatably supported between the cylinder block 21 and the crankcase 22 so as to be placed in the transverse direction of the body. The cylinder block 21 has a pair of cylinder bores 26 formed therein so as to extend in the longitudinal direction. A piston pin 28 of a piston 27 inserted in each of the cylinder bores 26 is connected to a crank pin 29 of the crankshaft 25 by means of a connecting rod 30. As a result, a sliding motion of the piston 27 in the cylinder bore 26 is converted into a rotational motion of the crankshaft 25 so as to provide output of the engine unit 14.

The cylinder head 20 receives therein two camshafts 32 and a valve train 33. Each of the cam shafts 32 is driven by the crankshaft 25 though a timing chain 34 so as to operate the valve train 33 at a prescribed timing to carry out an air intake action or an exhaust action in the cylinder bores 26. A counter shaft 36, which is in parallel with the crankshaft 61, is rotatably supported between the crankcase 22 and the rear cover 23. The counter shaft 36 has an extremely smaller axial length than the crankshaft 25. The rear portion of the crankcase 22 serving as the receiving member for the countershaft 36, and the rear cover 23 are placed so as to be biased (for example, toward the left-hand side) to form substantially an L-shape in the plan view of the engine unit 14.

A counter-driven gear 38 provided on the left-hand side of the countershaft 36 through a shock absorbing mechanism 37 meshes with a counter-drive gear 39 formed on a crank web of the left hand side of the crankshaft 25 so that the counter shaft 36 rotates in reverse in an interlocking movement to the crankshaft 25 rotating normally. A water pump 40 for circulating cooling water is provided on the left-hand end of the countershaft 36 and on the left-hand side surface of the rear cover 23 so as to be driven directly by the countershaft 36.

The transmission unit 15 is constructed so that a dry (i.e., air-cooled) belt drive-type transmission device (for example, a CVT) 85 is placed in a casing 42, which is separately formed from the engine unit 14. The casing 42 has a three-piece structure comprising an inner case 44, which is placed on the inner side (i.e., the left-hand side) in the width direction of the body, an outer case 45 for covering fluid-tightly the outside (i.e., the right-hand side) of the inner case 44 and a case cover 46 for covering the outside of the outer case 45. The case cover 46 is provided with an intake duct 47 formed thereon so as to serve as an opening communicating with the outside of the case cover 46. An air cleaner (not shown) is connected to the upstream side of the intake duct 47 (i.e., the outside of the casing 42).

The belt drive-type transmission device 43 has structural components, i.e., a transmission input shaft 49 and a transmission output shaft 50 that are rotatably supported on the front and rear sides of the casing 42, respectively, so as to be in parallel with the crankshaft 25; an input V-belt pulley 51 and an output V-belt pulley 52 that are fitted on these shafts 49 and 50, respectively, so as to be rotatable together with them; a V-belt (i.e., a CVT belt) 53 stretching between these pulleys 51 and 52; and a facing drive mechanism 54 provided so as to be coaxial with the input V-belt pulley 51.

The input V-belt pulley 51 has a stationary facing 56 formed integrally with the transmission input shaft 49 and a movable facing 57 provided so as to be movable in the axial direction. The facing drive mechanism 54 determines the position of the movable facing 57. The output V-belt pulley 52 also has a stationary facing 58 and a movable facing 59. The movable facing 59 is always urged resiliently against the side of the stationary facing 58 by means of a spring 60.

The casing 42 of the transmission unit 15 (i.e., the inner case 44) is stationarily connected at its front and left-hand surface to the right-hand surface of the joined portion of the crank case 22 and the rear cover 23 of the engine unit 14 so that the countershaft 36 of the engine unit 14 is connected to the transmission input shaft 49 of the transmission unit 15 so as to be rotatable together with the transmission input shaft 49.

The countershaft 36 has a dual structure in which a tubular outer shaft 36o is provided around the outer periphery of an inner shaft 36i so as to be coaxial with the inner shaft 36i and make a relative movement thereto. The above-mentioned shock absorbing mechanism 37 is provided between the counter-driven gear 38, which is provided on the side of the inner shaft 36i so as to be rotatable together therewith, and the outer shaft 36o. The outer peripheral portion of the left-hand side of the transmission input shaft 49 is fitted into the inner peripheral portion of the right-hand side of the outer shaft 36o in a spline connection manner.

A cooling fan chamber 62 is provided in the joined portion of the casing 18 of the engine unit 14 and the casing 42 of the transmission unit 15. An extended wall portion 63, which is integrally formed with the casing 18 (i.e., the crank case 22 and the rear cover 23) and another extended wall portion 64, which is integrally formed with the casing 42 (i.e., the inner case 44) and combined with the extended wall portion 63 in a butting manner defines the cooling fan chamber 62. Such a feature provides a simplified structure without provision of an exclusive cowling member and prevents degradation in strength. A gasket 65 made of thermal insulating material is held between the joined ends of the extended wall portions 63, 64.

The cooling fan chamber 62 communicates with the inside of the casing 42 through a plurality of vent holes 66 formed on the side of the inner case 44 and also communicates with the outside (i.e., outside air) through a not-shown discharge holes. A cooling fan 67 is disposed in the cooling fan chamber 62. The cooling fan 67, which is formed of material having a high thermal conductivity, such as aluminum, is fitted to the connecting portion of the countershaft 36 and the transmission input shaft 49 or the vicinity thereto, for example, the right-hand end of the outer shaft 36o, in a spline connection manner.

An additional cooling fan 69 is also provided on the transmission output shaft 50 of the transmission unit 15 so as to be rotatable together with the transmission output shaft 50. The cooling fan 69, which is integrally formed for example with the right hand surface of the stationary facing 58 of the output V-belt pulley 52, is adjacent to the case cover 46 through a partition wall 70. The partition wall 70 has a plurality of vent holes 71 formed thereon so as to face the cooling fan 69. The cooling fan 69 serves as an inlet fan and the cooling fan 67 serves as a suction fan.

With respect to a bevel unit 16, a reduction gear 75 and a reduction gear 76 are rotatably supported in the front side and the rear side of an independent casing 74 so as to mesh with each other. A bevel gear 77, which is coaxially disposed on the left-hand side of the reduction gear 76 so as to be rotatable together with the reduction gear 76, meshes with a bevel gear 79, which is rotatable together with a bevel output shaft 78 that is placed in the longitudinal direction of the body and rotatably supported. The rear end of the bevel output shaft 78 projects rearward from the casing 74.

The casing 74 of the bevel unit 16 is stationarily connected at its front and right-hand side surface to the rear and left-hand side surface of the casing 42 of the transmission unit 15. The left-hand end of the transmission output shaft 50, which projects leftward from the transmission unit 15, comes into the bevel unit 16 and is connected to the reduction gear 75 in a spline connection manner so as to be rotatable together with the reduction gear 75. The shaft drive unit 5 described above is connected to the rear portion of the bevel unit 16. The rear end of the bevel output shaft 78 is connected to a drive shaft (not shown) rotatably supported in the shaft drive unit 5, through a universal joint 80.

In the power unit 4 having the above-described structure, rotation of the crankshaft 25 of the engine unit 14 is transmitted at a prescribed reduction ratio to the countershaft 36. Rotation of the countershaft 36 is input directly to the transmission input shaft 49 of the transmission unit 15 and the input V-belt pulley 51. Rotation of the input V-belt pulley 51 is transmitted to the output V-belt pulley 52 and the transmission output shaft 50 through the V-belt 53. Rotation of the transmission output shaft 50 is further reduced by means of the reduction gears 75, 76 of the bevel unit 16, and then transmitted to the bevel output shaft 78 through the bevel gears 77, 79 so that rotation of the bevel output shaft 78 is transmitted to the rear wheel 3 through the drive shaft in the shaft drive unit 5. The shaft drive unit 5 is provided therein with for example an electromagnetic starting clutch (not shown) so that an ON/OFF operation of the starting clutch causes transmission of power of the engine unit 14 to the rear wheel 3 or releases the transmission.

The facing drive mechanism 54 of the belt drive-type transmission device 43 in the transmission unit 15 moves the movable facing 57 of the input V-belt pulley 51 in the axial direction in response to conditions of the motorcycle 1, such as cruising speed, a throttle opening, engine load and the like, due to power of an actuator controlled by means of a control device (not shown).

When starting the motorcycle 1, for example, the facing drive mechanism 54 moves the movable facing 57 away from the stationary facing 56 so as to provide the smallest effective diameter of the input V-belt pulley 51, on which the V-belt is stretched. Accordingly, the movable facing 59 is urged against the side of the stationary facing 58 under the resilient force given by the spring 60 on the side of the output V-belt pulley 52 so as to provide the maximum effective diameter of the output V-belt pulley 52, on which the V-belt is stretched, leading to a high transmission ratio and facilitating the starting operation.

During an acceleration operation of the motorcycle 1, the facing drive mechanism 54 gradually puts the movable facing 57 of the input V-belt pulley 51 toward the stationary facing 56, so as to increase the effective diameter of the input V-belt pulley 51, on which the V-belt is stretched. As a result, the movable facing 59 moves away from the stationary facing 58 against the resilient force of the spring 60 on the side of the output V-belt pulley 52 so as to decrease the effective diameter of the output V-belt pulley 52, leading to a low transmission ratio and an increased speed of the motorcycle.

The cooling fan 69 serving as the inlet fan rotates together with the transmission output shaft 50 during operation of the transmission unit 15 so that outside air is taken from the intake duct 47 of the case cover 46 and introduced as cooling air into the casing 42. The cooling fan 67 serving as the suction fan also rotates together with the transmission input shaft 49 (the countershaft 36) so that the cooling air in the casing 42 is sucked into the cooling fan chamber 62 through the vent holes 66 and then discharged from the discharged holes (not shown).

Accordingly, the cooling air flows in the casing 42 from the rear side thereof toward the front side thereof to provide a cooling function to reduce heat, which is generated through internal friction of the V-belt 53 due to its expansion and contraction as well as contact friction between the V-belt 53 and the input and output V-belt pulleys 51, 52 during operation of the belt drive-type transmission device 43. The cooling air, which always flows within the cooling fan chamber 62 provided between the casing 18 of the engine unit 14 and the casing 42 of the transmission unit 15, isolates heat of the engine unit 14 from the transmission unit 15. It is therefore possible to enhance the cooling operation in the transmission unit 15, thus improving remarkably durability of the belt drive-type transmission device 43.

According to the structure in which the two cooling fans 67, 69 are provided on the front and rear sides of the casing 42 so that one of them serves as the inlet fan and the other serves the suction fan, it is possible to increase flow velocity and flow rate of the cooling air in the casing 42, thus remarkably improving the cooling operation in the transmission unit 15, in comparison with a case where a single fan is provided.

The feature that the cooling fan 67 is made of material having a high thermal conductivity, such as aluminum, makes it possible to radiate the most of heat of the engine unit 14, which is apt to be transmitted to the transmission unit 15 through the transmission input shaft 49 from the countershaft 36, by means of the cooling fan 67, prior to transmission of the heat to the transmission input shaft 49, to discharge the heat together with the cooling air.

The gasket 65, which is made of thermal insulating material, is provided between the joined portions of the casing 18 (the extended wall portion 63) and the casing 42 (the extended wall portion 64). It is therefore possible to effectively isolate heat of the casing 18 from the casing 42.

According to the structural features described above, it is possible to securely prevent heat of the engine unit 14 from being transmitted to the transmission unit 15 through the countershaft 36 and the transmission input shaft 49 as well as the casing 18 and the casing 42, thus enhancing the cooling operation in the transmission unit 15.

Figure 4:
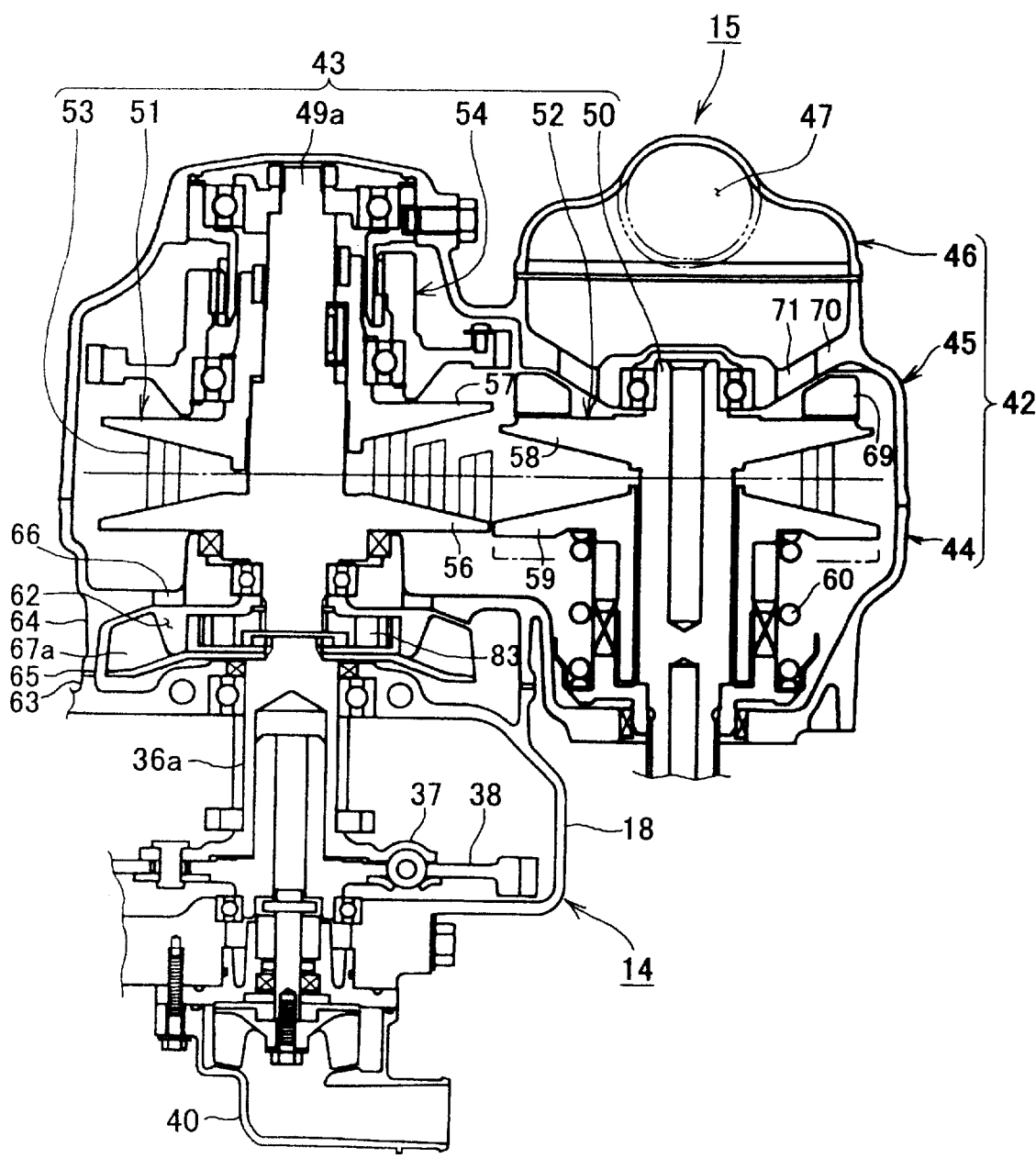
FIG. 4 is an enlarged cross-sectional view of the rear portion of the engine unit and the transmission unit of the second embodiment of the present invention.

FIG. 4 illustrates the second embodiment of the present invention. The structural components and functions provided by them in the second embodiment are identical to those in the first embodiment described above except for connecting portions of the countershaft 36a of the engine unit 14 and the transmission input shaft 49a of the transmission unit 15 and their surroundings. The same reference numerals are given to the same structural components and description of them is omitted.

In the second embodiment, the countershaft 36a and the transmission input shaft 49a are connected through a flexible joint 83. The cooling fan 67a is provided on the flexible joint 83 so as to be adjacent to the countershaft 36a.

Figure 5:
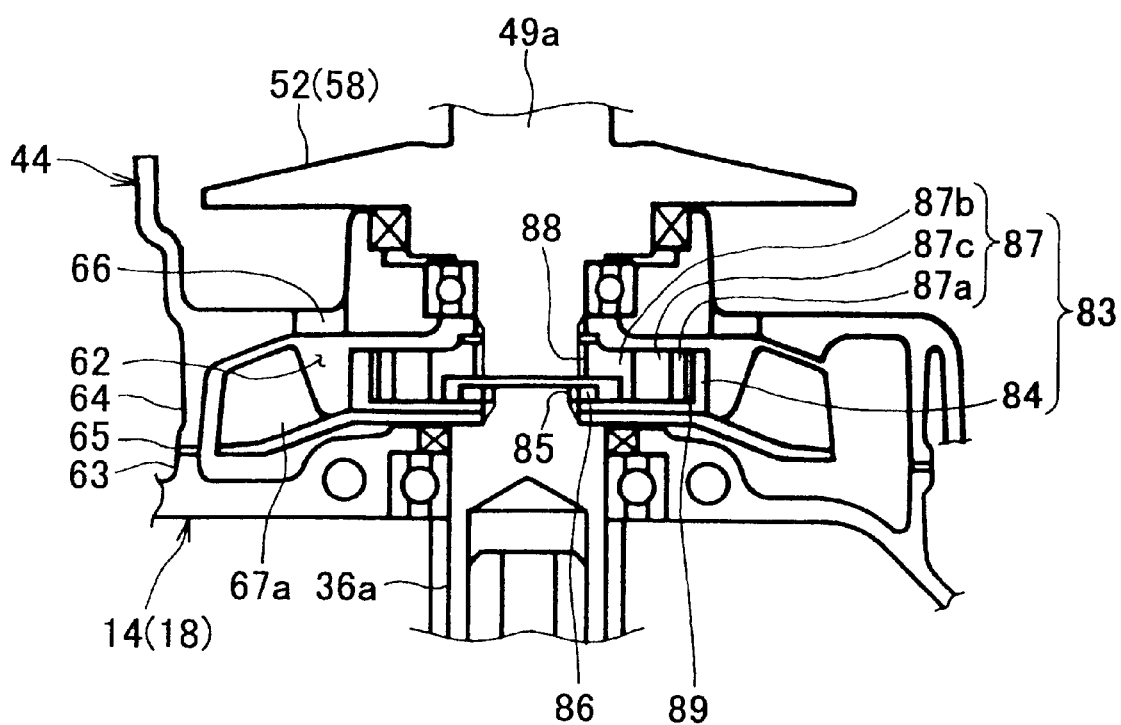
FIG. 5 is an enlarged cross-sectional view of the cooling fan chamber and it surroundings in FIG. 4.

As shown in FIG. 5 in an enlarged manner, the countershaft 36a is not directly connected to the transmission input shaft 49a. The cooling fan 67a and an outer piece 84 of the flexible joint 83 are secured to the right-hand end portion of the countershaft 36a by means of a spline fitting portion 85 and a locking ring 86 fastened thereto so as to be rotatable together with the countershaft 36a. An inner piece 87 of the flexible joint 83 is fitted on the left-hand end portion of the transmission input shaft 49a through a spline fitting portion 88 so as to be rotatable together with the transmission input shaft 49a. The outer piece 84 is connected to the inner piece 87 by means of a spline-fitting portion 89 so as to be rotatable together with the inner piece 87.

A flexible portion 87c, which is made of resilient material such as rubber and has a thermal insulating property, is secured between an outer peripheral portion 87a and an inner peripheral portion 87b of the inner piece 87. Resilient deformation of the flexible portion 87c permits slight deflection in the rotational direction between the outer peripheral portion 87a and the inner peripheral portion 87b. As a result, the resilient deformation of the flexible joint 83 (i.e., the flexible portion 87c) absorbs torque fluctuation from the countershaft 36a so as to prevent sudden slip from occurring between the respective pulleys 51, 52 and the V-belt 53 of the belt drive-type transmission device 43. It is therefore possible to prevent occurrence of an excessively large frictional force, thus improving the cooling operation in the transmission unit 15.

The cooling fan 67a, which is made of material having a high thermal conductivity such as aluminum, is provided on the countershaft 36a so as to be rotatable together with the countershaft 36a. In addition, the flexible joint 83 is provided between the cooling fan 67a and the transmission input shaft 49a. Accordingly, it is possible to radiate the most of heat of the engine unit 14, which is apt to be transmitted to the transmission unit 15 through the transmission input shaft 49a from the countershaft 36a, by means of the cooling fan 67a, prior to transmission of the heat to the transmission input shaft 49a, to discharge the heat together with the cooling air. In addition, the flexible joint securely isolates residual heat from the transmission input shaft 49a. As a result, heat of the engine unit is not easily transmitted to the transmission unit 15.

In addition, the flexible portion 87c of the flexible joint 83 has a thermal insulating property. Such a flexible joint 83 more surely isolates heat of the engine unit 14, which is apt to be transmitted to the transmission unit 15 through the countershaft 36a and the transmission input shaft 49a. Not only the flexible portion 87c of the flexible joint 83, but also the other portion (the outer piece 84, the outer peripheral portion 87a, the inner peripheral portion 87b and the like) thereof may be formed of material having a thermal insulating property.

It is further to be noted that the present invention is not limited to the described embodiment and many other changes, modifications and alternations may be made without departing from the scopes of the appended claims.

That is, for example, the structural features of the power unit described above may be applied not only to the power unit for the scooter-type motorcycle, but also to the power unit for the other type of motorcycle or the other kind of vehicle.

What is claimed is:

1. A power unit for a motorcycle comprising:
   an engine unit having a casing in which a crankshaft and a countershaft are rotatably supported in parallel to each other;
   a transmission unit having a casing in which a transmission input shaft and a transmission output shaft are rotatably supported in parallel to each other to define a dry belt drive-type transmission device, said transmission input shaft of the transmission unit being connected to said countershaft of the engine unit so as to be rotatable together with said countershaft;
   a cooling fan chamber provided at a joined portion of the casing of said engine unit to the casing of said transmission unit, said cooling fan chamber communicating with an inside and outside of the casing of the transmission unit; and
   a cooling fan disposed in said cooling fan chamber so as to rotate together with a connecting portion of said countershaft with said transmission input shaft in a vicinity of said connecting portion;
   Wherein said cooling fan introduces cooling air into the casing of the transmission unit.

2. A power unit for a motorcycle according to claim 1, wherein an additional cooling fan is also provided on the transmission output shaft so as to rotate together with the transmission output shaft, an opening communicating with outside of said transmission unit is provided in a vicinity of said additional cooling fan, one of said additional cooling fan and said cooling fan provided rotatably together with said countershaft and said transmission input shaft serves as a inlet fan and an other thereof serves as a suction fan.

3. A power unit for a motorcycle according to claim 1, wherein said cooling fan provided rotatably together with said countershaft and said transmission input shaft is made of material having a high thermal conductivity.

4. A power unit for a motorcycle according to claim 1, wherein said joined portion of the casing of said engine unit to the casing of said transmission unit is provided with a gasket held therebetween, said gasket being made of thermal insulating material.

5. A power unit for a motorcycle according to claim 1, wherein said countershaft and said transmission input shaft are connected to each other through a flexible joint.

6. A power unit for a motorcycle according to claim 5, wherein said cooling fan provided rotatably together with said countershaft and said transmission input shaft is stationarily secured to a side of said countershaft; and said flexible joint is provided between said cooling fan and said transmission input shaft.

7. A power unit for a motorcycle according to claim 5 or 6, wherein at least one portion of said flexible joint is made of thermal insulating material.

* * * * *